US010008738B2

(12) United States Patent
Dai et al.

(10) Patent No.: US 10,008,738 B2
(45) Date of Patent: Jun. 26, 2018

(54) NANOCONFINED ELECTROLYTES AND THEIR USE IN BATTERIES

(71) Applicant: UT-Battelle, LLC, Oak Ridge, TN (US)

(72) Inventors: Sheng Dai, Knoxville, TN (US); Jinshui Zhang, Oak Ridge, TN (US); Xiao-Guang Sun, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 245 days.

(21) Appl. No.: 14/843,559

(22) Filed: Sep. 2, 2015

(65) Prior Publication Data

US 2016/0351944 A1    Dec. 1, 2016

Related U.S. Application Data

(60) Provisional application No. 62/166,941, filed on May 27, 2015.

(51) Int. Cl.
| | | |
|---|---|---|
| *H01M 10/056* | (2010.01) | |
| *H01M 10/052* | (2010.01) | |
| *H01M 10/054* | (2010.01) | |

(52) U.S. Cl.
CPC ....... *H01M 10/056* (2013.01); *H01M 10/052* (2013.01); *H01M 10/054* (2013.01)

(58) Field of Classification Search
CPC ............. H01M 10/052; H01M 10/054; H01M 10/056; H01M 10/0562; H01M 10/0565; H01M 10/0569; H01M 2300/0071; H01M 2300/0082; H01M 2300/0028
See application file for complete search history.

(56) References Cited

U.S. PATENT DOCUMENTS

| | | |
|---|---|---|
| 6,589,692 B2 | 7/2003 | Takami |
| 7,205,073 B2 | 4/2007 | Kim et al. |
| 7,425,388 B2 | 9/2008 | Park et al. |
| 8,252,438 B2 | 8/2012 | Han et al. |
| 8,361,661 B2 | 1/2013 | Doe et al. |
| 8,663,844 B2 | 3/2014 | Kang et al. |
| 8,835,041 B2 | 9/2014 | Johnson et al. |
| 8,906,542 B2 | 12/2014 | Johnson et al. |
| 2008/0182176 A1 | 7/2008 | Aurbach et al. |
| 2012/0021273 A1 | 1/2012 | Ohmori et al. |
| 2013/0034780 A1 | 2/2013 | Muldoon et al. |
| 2013/0209897 A1* | 8/2013 | Paranthaman .......... H01M 4/48 429/405 |
| 2013/0316221 A1* | 11/2013 | Lee ..................... H01M 2/1673 429/144 |
| 2014/0099560 A1* | 4/2014 | Parans Paranthaman ........ H01M 4/483 429/405 |
| 2014/0113202 A1 | 4/2014 | Sun et al. |
| 2015/0056499 A1 | 2/2015 | Dai et al. |

FOREIGN PATENT DOCUMENTS

| | | | |
|---|---|---|---|
| JP | H0610984 B2 * | 2/1994 | ............. H01M 6/16 |
| JP | 2012099421 A * | 5/2012 | |
| KR | 20020025302 A * | 4/2002 | .......... H01M 10/052 |
| WO | WO-2013033126 A1 * | 3/2013 | .......... H01M 10/052 |
| WO | WO 2013/049097 A1 | 4/2013 | |
| WO | WO 2013/096827 A1 | 6/2013 | |

OTHER PUBLICATIONS

Wang, H. et al., "Hollow permeable polysiloxane capsules: a novel approach for fabrication, guest encapsulation and morphology studies", J. Mater. Chem., (2004), vol. 14, pp. 1648-1651.
Wang, Z. et al., "Metal Oxide Hollow Nanostructures for Lithium-ion Batteries", Adv. Mater., (2012), vol. 24, pp. 1903-1911.
Wu, H.B. et al., "Nanostructured metal oxide-based materials as advanced anodes for lithium-ion batteries", Nanoscale, (2012), vol. 4, pp. 2526-2542.
Yan, N. et al., "Hollow Porous SiO2 Nanocubes Towards High-performance Anodes for Lithium-ion Batteries", Scientific Reports, (Mar. 28, 2013), vol. 3, pp. 1-6.
Smovzh, D.V. et al., "Synthesis of Hollow Nanoparticles γ-Al2O3", Advances in Nanoparticles, (2013), vol. 2, pp. 120-124.
Ansari, Y. et al., "Low-Cost, Dendrite-Blocking Polymer-Sb2O3 Separators for Lithium and Sodium Batteries", Journal of the Electrochemical Society, (2014), vol. 161, No. 10, pp. A1655-A1661.
Park, K. et al., "New battery strategies with a polymer/Al2O3 separator", Journal of Power Sources, (2014), vol. 263, pp. 52-58.
Zhengyuan, T. et al., "Nanoporous Polymer-Ceramic Composite Electrolytes for Lithium Metal Batteries", Adv. Energy Mater., (2014), vol. 4, pp. 1-6.

* cited by examiner

*Primary Examiner* — Gregg Cantelmo
(74) *Attorney, Agent, or Firm* — Scully Scott Murphy & Presser

(57) ABSTRACT

A nanoconfined metal-containing electrolyte comprising a layer of enclosed nanostructures in which each enclosed nanostructure contains a liquid metal-containing electrolyte, wherein said enclosed nanostructures are in physical contact with each other. Metal-ion batteries containing the nanoconfined electrolyte in contact with an anode and cathode of the battery are also described. Methods for producing the nanoconfined electrolyte are also described.

9 Claims, 10 Drawing Sheets

US 10,008,738 B2

NANOCONFINED ELECTROLYTES AND THEIR USE IN BATTERIES

The present application claims benefit of U.S. Provisional Application No. 62/166,941, filed on May 27, 2015, all of the contents of which are incorporated herein by reference.

This invention was made with government support under Prime Contract No. DE-AC05-00OR22725 awarded by the U.S. Department of Energy. The government has certain rights in the invention.

FIELD OF THE INVENTION

The present invention relates generally to electrolyte compositions for batteries, such as lithium-ion and sodium-ion batteries, and also to methods for mitigating the growth and proliferation of metal (e.g., lithium or sodium) dendrites during cell recharge.

BACKGROUND OF THE INVENTION

Lithium-based batteries are widely used in consumer electronics, such as laptop computers, camcorders, cameras, and cell phones, and are increasingly being considered for applications in electric vehicles, including electric vehicles (EVs), hybrid electric vehicle (HEVs), and plug-in hybrid-electric vehicles (PHEVs). However, their use has been largely obviated due to safety concerns related to formation of lithium dendrites, which generally originate at the anode and spread across to the cathode during repeated charge-discharge cycling. When an electric current passes through the dendrites, an internal short-circuit with localized overheating is generally the result. Since volatile liquid organic electrolytes are generally used in lithium batteries, local overheating can result in combustion, with dangerous consequences.

Solid Li ionic conductors, such as polymer, glass, and crystal, have been considered as promising candidates for electrolytes in lithium metal batteries, owing to their inherent advantages in terms of safety and device fabrication. For example, solid electrolytes with mechanical modulus above lithium metal can serve as rigid barriers that prevent lithium dendrites from crossing the inter-electrode space, thereby preventing the battery from short-circuiting. However, their ionic conductivities at room temperature are generally significantly below the optimal level for efficient battery operation. Organic liquid electrolytes, in contrast, generally possess superior ionic conductivities with fast ionic transport properties, which makes organic liquid electrolytes desirable for commercial use in Li-ion batteries. However, as discussed above, dendrite formation is known to occur with use of liquid electrolytes, and the liquid electrolytes may combust as a result of short circuiting from dendrite formation. Aside from problems associated with dendrite formation, lithium batteries employing organic liquid electrolytes are also subject to electrolyte leakage. Sodium-ion batteries are also gaining increasing interest as cost-effective alternatives with greater safety potential. However, sodium dendrites are also a known concern. Thus, there would be a significant benefit in an electrolyte that could provide the beneficial aspects of both solid and liquid electrolytes while mitigating each of their drawbacks.

SUMMARY OF THE INVENTION

In one aspect, the invention is directed to a nanoconfined metal-containing electrolyte containing a layer of enclosed nanostructures in which each enclosed nanostructure contains a liquid metal-containing electrolyte, wherein the enclosed nanostructures are in physical contact with each other. The nanoconfined electrolyte described herein advantageously possesses the high level of conductivity normally provided by an organic liquid electrolyte while also possessing the significant resistance to formation of metal dendrites generally provided by solid electrolytes. The invention is also directed to metal-ion batteries in which the above-described nanoconfined electrolyte is in contact with an anode and cathode of the metal-ion battery.

In another aspect, the invention is directed to a method for producing the above-described nanoconfined electrolyte. In a particular embodiment, the method includes: (i) forming a layer of hollow enclosed nanostructures, wherein the hollow enclosed nanostructures are in physical contact with each other; and (ii) loading the hollow regions of the hollow enclosed nanostructures with a liquid metal-containing electrolyte by infusion of the liquid metal-containing electrolyte through walls of the hollow enclosed nanostructures.

DETAILED DESCRIPTION OF THE INVENTION

Figure 1:
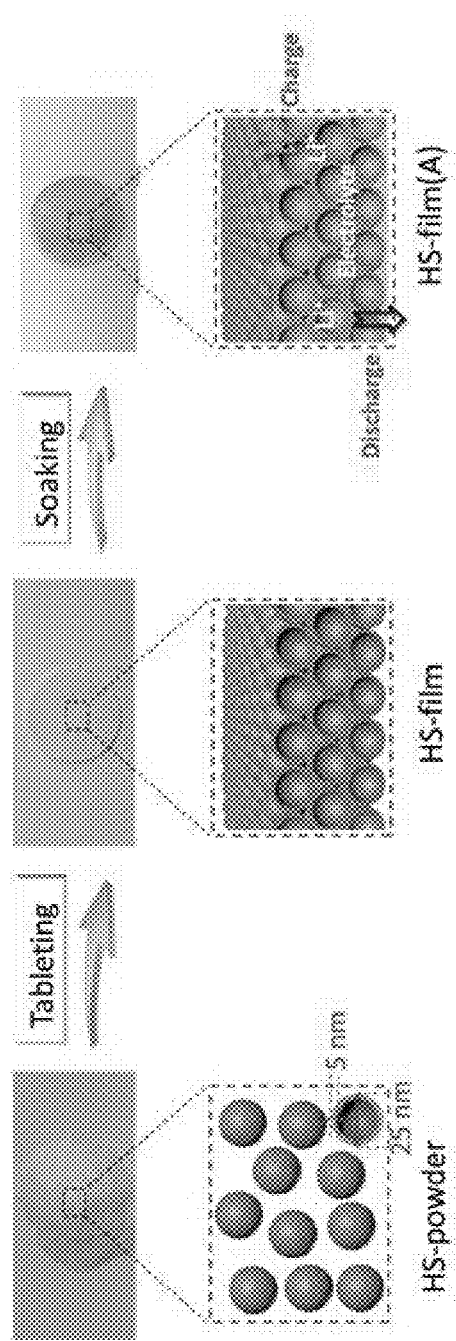
FIG. 1. Schematic showing a typical process for preparing a layer of nanoconfined electrolyte according to the invention, starting with HS (hollow silica) powder in a vessel (leftmost image), tableting (layering) the hollow silica particles in the vessel (middle image), and soaking the layer of HS particles in an electrolyte to produce a nanoconfined electrolyte film (rightmost image) having charging/discharging properties for a lithium battery.

In a first aspect, the instant disclosure is directed to a nanoconfined metal-containing electrolyte containing a layer of enclosed nanostructures in which each enclosed nanostructure contains a liquid metal-containing electrolyte. The enclosed nanostructures are in physical contact with each other to ensure an acceptable level of conductivity and pathway for ion transport.

The term "enclosed nanostructure," as used herein, refers to a structure of nanoscale size (i.e., less than 1 micron in its longest dimension) with an interior portion that is hollow when not filled with the liquid electrolyte, and which possesses an absence of any opening that could permit the appreciable release or any release of the electrolyte contained within its walls. In some embodiments, the enclosed nanostructure possesses an absence of pores. In other embodiments, the enclosed nanostructure possesses pores of a small enough size that liquid electrolyte contained within its walls is substantially or completely prevented from escaping. Typically, to ensure substantial or complete retention of the liquid electrolyte within the enclosed nanostructure (by, for example, capillary action), the majority (e.g., at least 90%, 95%, 98%, or 99%) or all (100%) of the pores have a pore size of up to or less than 6 nm. In some embodiments, at least 90%, 95%, 98%, 99%, or all of the pores have a pore size of about, up to, or less than 5 nm, 4 nm, 3 nm, 2 nm, or 1 nm, or a pore size within a range bounded by any two of the foregoing values. As used herein, the term "about" generally indicates within ±0.5%, 1%, 2%, 5%, or up to ±10% of the indicated value. For example, a size of "about 10 nm" generally indicates in its broadest sense 10 nm±10%, which indicates 9.0-11.0 nm. The term "about" may also indicate a level of variation, such as in a distribution of sizes.

Typically, the majority (e.g., at least 90%, 95%, 98%, or 99%) or all (100%) of the enclosed nanostructures have a size of at least 10 nm and up to 500 nm. In different embodiments, at least 90%, 95%, 98%, 99%, or all of the enclosed nanostructures have a size of about or at least, for example, 10, 15, 20, 25, 30, 40, 50, 100, 150, 200, 250, 300, 400, or 500 nm, or a size within a range bounded by any two of the foregoing values. Generally, the enclosed nanostructures are completely or approximately spherical in shape, in which case the size can refer to any of the three dimensions of the enclosed nanostructure. In the case of nanostructures that significantly diverge from spherical (e.g., ovoid or tubular) in shape, the size generally refers to either the longest dimension of the nanostructure or the average in size of all dimensions over all nanostructures. In some embodiments, the hollow nanostructures (and resulting electrolyte-filled nanostructures) are substantially uniform in size by having a variation in size of no more than 20%, 10%, 5%, or 1% from an indicated value. The enclosed nanostructures can have any suitable shell (wall) thickness sufficient to withstand modest elevated pressures, but the shell is typically at least 1, 2, 5, 10, or 20 nm thick.

The enclosed nanostructures can be constructed of any solid material with sufficient mechanical strength to resist rupture, flattening, or significant deformation when subjected to a substantial force or pressure, e.g., a pressure of at least 0.01, 0.1, 1, 2, 5, or 10 GPa. The composition of the enclosed nanostructures should also be unreactive with the liquid electrolyte and components of the battery, such as the anode and cathode materials.

In one embodiment, the enclosed nanostructures include or are completely constructed of a metal oxide composition. The metal in the metal oxide can be or include any suitable metal, such as, for example, a main group or transition metal, which is herein regarded as any of the elements within Groups 3-15 of the Periodic Table of the Elements that can form a solid oxide composition. Some examples of main group metal oxide compositions include oxides of Groups 13-15, such as $SiO_2$ (i.e., "silicon oxide" or "silica"), $Al_2O_3$, $B_2O_3$, $Ga_2O_3$, $SnO$, $SnO_2$, $PbO$, $PbO_2$, $Sb_2O_3$, $Sb_2O_5$, and $Bi_2O_3$. Some examples of transition metal oxide compositions include oxides of Groups 3-12, such as, $Sc_2O_3$, $TiO_2$, $Cr_2O_3$, $Fe_2O_3$, $Fe_3O_4$, $FeO$, $Co_2O_3$, $Co_3O_4$, $Ni_2O_3$, $CuO$, $Cu_2O$, $ZnO$, $Y_2O_3$, $ZrO_2$, $NbO_2$, $Nb_2O_5$, $RuO_2$, $PdO$, $Ag_2O$, $CdO$, $HfO_2$, $Ta_2O_5$, $WO_2$, and $PtO_2$. The metal oxide may also be a complex metal oxide by including more than one metal, such as a spinel metal oxide (e.g., $CoMn_2O_4$, $ZnMn_2O_4$, $Zn_xCo_{3-x}O_4$, or $LiNi_{0.5}Mn_{1.5}O_4$) or perovskite metal oxide (e.g., $CaTiO_3$, $BaTiO_3$, and $La_{0.8}Sr_{0.2}MnO_3$). Numerous and diverse methods for preparing these metal oxide hollow nanostructures are well known in the art. The synthesis of hollow silica nanoparticles is described, for example, in Yan et al., *Scientific Reports*, 3, 1568 (2013); Nandiyanto et al., *Langmuir*, 28(23), pp. 8616-8624 (2012); Fuji et al., *Advanced Powder Technology*, 23(5), pp. 562-565 (September 2012); and Hah et al., *Chem. Commun.*, pp. 1712-1713 (2003), the contents of which are herein incorporated by reference in their entirety. The synthesis of hollow alumina nanoparticles is described, for example, in Smovzh et al., *Advances in Nanoparticles*, 2, pp. 120-124 (2013); Lee et al., *Thin Solid Films*, vol. 529, pp. 394-397, February 2013; and Wang et al., *Journal of the American Ceramic Society*, vol. 92: S32-S37 (2009), the contents of which are herein incorporated by reference in their entirety. The synthesis of hollow nanostructures constructed of $SnO_2$, $TiO_2$, $Fe_2O_3$, and $Co_3O_4$ is described, for example, in Wang et al., *Advanced Materials*, 24(14), pp. 1903-1911, April 2012 and Wu et al., *Nanoscale*, 4, pp. 2526-2542 (2012), the contents of which are herein incorporated by reference in their entirety. The synthesis of hollow nanostructures constructed of mixed metal oxides is described, for example, in Wang et al., *Advanced Materials*, 24(14), pp. 1903-1911, April 2012; Wu et al., *ACS Nano*, 8(6), pp. 6297-6303 (2014); and Lu et al., *Journal of Power Sources*, 271, pp. 55-59 (2014), the contents of which are herein incorporated by reference in their entirety.

The enclosed nanostructures may also have a metal sulfide composition, which may be a sulfur-substituted version of any of the metal oxide compositions provided above (for example, ZnS or CuS). The synthesis of hollow nanoparticles having a metal sulfide composition is described, for example, in Niu et al., *Langmuir*, 26(22), pp. 16652-16657 (2010); Guo et al., *ACS Nano*, 7(10), pp. 8780-8793, 2013; and Xu et al., *Ultrasonics Sonochemistry*, 13(5), pp. 451-454, July 2006; the contents of which are herein incorporated by reference in their entirety. In some embodiments, any one or more classes or specific types of metal oxide or sulfide compositions is excluded from the nanostructure.

In another embodiment, the enclosed nanostructures include or are completely constructed of a crosslinked polymer composition. The polymer may be organic, inorganic, or a combination thereof (i.e., hybrid). The organic polymer hollow nanostructure can be, for example, based on maleic anhydride and divinylbenzene (DVB), such as described in Deng et al., *J. Phys. Chem. B*, 114(8), pp. 2593-2601 (2010), the contents of which are herein incorporated by reference in their entirety. The organic polymer hollow nanostructure may alternatively be based on divinylbenzene reaction with either methylmethacrylate (MMA) or styrene, such as described in Itou et al., *Colloids and Surfaces A: Physicochemical and Engineering Aspects,* 153 (1-3), pp. 311-316 (1999) and Li et al., *Scientific Reports,* 3, no. 2128 (2013), the contents of which are herein incorporated by reference in their entirety. The organic polymer hollow nanostructure may alternatively be constructed of poly(lactic-co-glycolic)acid (PGLA), such as described in Raichur et al., 1(4), *Mater. Res. Express,* 045407. doi: 10.1088/2053-1591/1/4/045407 (2014), the contents of which are herein incorporated by reference in their entirety. The organic polymer hollow nanostructure may alternatively be prepared by reaction of poly(4-vinylpyridine) (P4VP) with poly(amic acid) ester, such as described in Chen et al., *Acc. Chem. Res.,* 38(6), pp. 494-502 (2005), the contents of which are herein incorporated by reference in their entirety. In the case of an inorganic or hybrid organic-inorganic (hybrid) polymer nanostructure, the polymer may, in one embodiment, be in the form of crosslinked polyphosphazene nanospheres, such as described in Liu et al., *Journal of Materials Chemistry,* 21(34), p. 12964-12968 (2011), the contents of which are herein incorporated by reference in their entirety. In another embodiment, the hybrid polymer composition may be in the form of hollow polysiloxane nanospheres, such as described in Wang et al., *Journal of Materials Chemistry,* 14, pp. 1648-1651 (2004), the contents of which are herein incorporated by reference in their entirety. In some embodiments, the polymeric hollow nanostructures are semiconductive, such as described in, for example, Landester et al., *Advanced Materials,* 14(9), pp. 651-655 (2002), the contents of which are herein are incorporated by reference in their entirety.

In another embodiment, the enclosed nanostructures include or are completely constructed of carbon. The carbon nanostructures can be, for example, as described in Zheng et al., *Nature Nanotechnology,* 9, pp. 618-623 (2014); Zhang et al., *J. Mater. Sci.,* 49, pp. 1947-1956, 2014; and Tang et al., *Advanced Energy Materials,* 2(7), pp. 873-877 (2012); the contents of which are herein incorporated by reference in their entirety.

The above-described enclosed nanostructures, when filled with electrolyte, are arranged in a layer (i.e., film) with the enclosed nanostructures in physical contact with each other. Typically, the layer includes stacking of the nanostructures; however, a monolayer of the nanostructures is also possible and considered herein. The thickness of the layer is typically up to or less than 1 mm. In some embodiments, the layer has a thickness of up to or less than, for example, 0.8 mm, 0.5 mm, 0.25 mm, or 0.1 mm (100 µm). In some embodiments, the enclosed nanostructures include surface functionalities (e.g., nitrile-containing groups) that serve to physically connect the nanostructures in a self-assembly process, wherein the functionalities connect with each other by any suitable engagement, e.g., ionic bonding, hydrogen bonding, or covalent bonding. In other embodiments, surface functionalities that connect the nanostructures are not present.

The liquid metal-containing electrolyte (i.e., "electrolyte"), as contained within the enclosed nanostructures, includes at least a metal salt, which may, itself, be a liquid at room temperature or during operation. The metal salt, which may be a solid or liquid, is commonly dissolved in a solvent. The metal salt and solvent can be any of the metal salts and solvents known to be useful in a metal-ion battery, such as a lithium-ion battery, sodium-ion battery, magnesium-ion battery, zinc-ion battery, or aluminum-ion battery. In the particular case of lithium-ion and sodium-ion batteries, any of the lithium salts, sodium salts, and solvents known in the art of lithium- and sodium-ion batteries can be included in the electrolyte. In some instances, the term "metal salt" also includes metal compounds that may not be considered true salts, in instances where the metal compound possesses a low ionic or substantially covalent bonding character between the anion and cation, such as in a metal alkoxide. The metal in the metal salt is typically selected from alkali metals (e.g., lithium, sodium, and potassium), alkaline earth metals (e.g., magnesium, calcium, and strontium), and main group metals (e.g., Groups 12-14, such as zinc, aluminum, gallium, and tin).

In the case of a lithium-ion battery, the electrolyte contains a lithium salt. The lithium salt can, in one embodiment, be non-carbon-containing (i.e., inorganic) by having an inorganic counteranion. The inorganic counteranion can be, for example, a halide (e.g., chloride, bromide, or iodide), hexachlorophosphate ($PCl_6^-$), hexafluorophosphate ($PF_6^-$), perchlorate, chlorate, chlorite, perbromate, bromate, bromite, periodate, iodate, aluminum fluoride (e.g., $AlF_4^-$), aluminum chloride (e.g., $Al_2Cl_7^-$ and $AlCl_4^-$), aluminum bromide (e.g., $AlBr_4^-$), nitrate, nitrite, sulfate, sulfite, phosphate, phosphite, arsenate, hexafluoroarsenate ($AsF_6^-$), antimonate, hexafluoroantimonate ($SbF_6^-$), selenate, tellurate, tungstate, molybdate, chromate, silicate, borates (e.g., borate, diborate, triborate, tetraborate), tetrafluoroborate, anionic borane cluster (e.g., $B_{10}H_{10}^{2-}$ and $B_{12}H_{12}^{2-}$), perrhenate, permanganate, ruthenate, perruthenate, or polyoxometalate.

In another embodiment, the lithium salt is carbon-containing (i.e., organic) by including an organic counteranion. The organic counteranion may, in one embodiment, lack fluorine atoms. The organic counteranion can be, for example, carbonate, a carboxylate (e.g., formate, acetate, propionate, butyrate, valerate, lactate, pyruvate, oxalate, malonate, glutarate, adipate, decanoate, and the like), sulfonate (e.g., $CH_3SO_3^-$, $CH_3CH_2SO_3^-$, $CH_3(CH_2)_2SO_3^-$, benzenesulfonate, toluenesulfonate, dodecylbenzenesulfonate, and the like), alkoxide (e.g., methoxide, ethoxide, isopropoxide, and phenoxide), amide (e.g., dimethylamide or diisopropylamide), diketonate (e.g., acetylacetonate), organoborate (e.g., $BR_1R_2R_3R_4^-$, wherein $R_1$, $R_2$, $R_3$, $R_4$ are typically hydrocarbon groups containing 1 to 6 carbon atoms), anionic carborane cluster, alkylsulfate (e.g., diethylsulfate), alkylphosphate (e.g., ethylphosphate or diethylphosphate), dicyanamide (i.e., $N(CN)_2^-$), tricyanamide (i.e., $N(CN)_3^-$), or phosphinate (e.g., bis-(2,4,4-trimethylpentyl) phosphinate). The organic counteranion may, in another embodiment, include fluorine atoms. The fluoride-containing counteranion can be, for example, a fluorosulfonate (e.g., $CF_3SO_3^-$, $CF_3CF_2SO_3^-$, $CF_3(CF_2)_2SO_3^-$, $CHF_2CF_2SO_3^-$, and the like), fluoroalkoxide (e.g., $CF_3O^-$, $CF_3CH_2O^-$, $CF_3CF_2O^-$, and pentafluorophenolate), fluorocarboxylate (e.g., trifluoroacetate and pentafluoropropionate), or fluorosulfonimide (e.g., $(CF_3SO_2)_2N^-$). In some embodiments, any one or more classes or specific types of lithium salts are excluded from the electrolyte. In other embodiments, a combination of two or more lithium salts are included in the electrolyte.

In the case of a sodium-ion battery, the electrolyte contains a sodium salt. The sodium salt can be any of the sodium salts known to be useful in the art of sodium-ion batteries. Some examples of sodium salts include $NaClO_4$, $NaPF_6$, $NaAsF_6$, $NaSbF_6$, $NaBF_4$, $NaCF_3SO_3$, $NaAlCl_4$, or $NaN(SO_2CF_3)_2$).

In the case of a magnesium-ion battery, the electrolyte contains a magnesium salt. The magnesium salt can be any of the magnesium salts know to be useful in the art of magnesium-ion batteries. Some examples of magnesium salts include the Grignard agents, such as denoted by the formula RMgCl (where R=methyl, ethyl, butyl). Other types of magnesium salts include $Mg(AlCl_2EtBu)_2$, where Et=ethyl and Bu=butyl. Yet other types of magnesium salts include the alkoxide magnesium halide class of magnesium compounds, such as n-BuOMgCl, t-BuOMgCl, Me3SiOMgCl, PhOMgCl, and BMP-MgCl, where PhO=phenoxy and BMP=2-tert-butyl-4-methylphenol. The foregoing and other types of magnesium compounds suitable for a magnesium-ion battery are described, for example, in U.S. Application Pub. No. 2015/0056499, the contents of which are herein incorporated by reference in their entirety.

In the case of a zinc-ion battery, the electrolyte contains a zinc salt. The zinc salt can be any of the zinc salts known to be useful in the art of zinc-ion batteries, such as described, for example, in U.S. Pat. No. 8,663,844, the contents of which are herein incorporated in their entirety. Some examples of zinc salts include zinc nitrate, zinc chloride, and zinc sulfate.

In the case of an aluminum-ion battery, the electrolyte contains an aluminum salt. The aluminum salt can be any of the aluminum salts known to be useful in metal-ion batteries, such as described, for example, in U.S. Pat. Nos. 7,648,798 and 6,589,692, the contents of which are herein incorporated in their entirety. Some examples of aluminum salts include aluminum chloride, aluminum bromide, aluminum iodide, aluminum nitrate, and aluminum tris(sec-butoxide).

The metal salt is incorporated in the electrolyte in an amount that imparts a sufficient concentration of metal ions and resulting suitable level of conductivity to the electrolyte. The conductivity of the electrolyte can be, for example, at least 0.01 mS/cm (0.001 S/m) at an operating temperature of interest, and particularly at a temperature within 20-60° C. The metal salt is typically present in an amount of at least or above 0.1 M concentration in the electrolyte. In different embodiments, the metal salt is present in the electrolyte in a concentration of about, at least, above, up to, or less than, for example, 0.5, 1.0, 1.2, 1.5, 1.8, 2, 2.5, or 3 M.

In one embodiment, the solvent in the electrolyte is an organic solvent. The term "organic solvent," as used herein, refers to any non-ionic carbon-containing solvent known in the art. The organic solvent typically has a melting point up to or less than 100, 90, 80, 70, 60, or 50° C., and more typically, below room temperature, i.e., below about 25° C., and more typically, up to or less than 20, 15, 10, 5, or 0° C. The organic solvent, which is typically also an aprotic polar solvent, can be, for example, a carbonate, sulfone, siloxane, silane, ether, ester, nitrile, sulfoxide, or amide solvent, or a mixture thereof. Some examples of carbonate solvents include propylene carbonate (PC), ethylene carbonate (EC), butylene carbonate (BC), chloroethylene carbonate, fluoro-carbonate solvents (e.g., fluoroethylene carbonate and trifluoromethyl propylene carbonate), as well as the dialkyl-carbonate solvents, such as dimethyl carbonate (DMC), diethyl carbonate (DEC), dipropyl carbonate (DPC), ethyl methyl carbonate (EMC), methyl propyl carbonate (MPC), and ethyl propyl carbonate (EPC). Some examples of sulfone solvents include methyl sulfone, ethyl methyl sulfone, methyl phenyl sulfone, methyl isopropyl sulfone (MiPS), propyl sulfone, butyl sulfone, tetramethylene sulfone (sulfolane), phenyl vinyl sulfone, allyl methyl sulfone, methyl vinyl sulfone, divinyl sulfone (vinyl sulfone), diphenyl sulfone (phenyl sulfone), dibenzyl sulfone (benzyl sulfone), vinylene sulfone, butadiene sulfone, 4-methoxyphenyl methyl sulfone, 4-chlorophenyl methyl sulfone, 2-chlorophenyl methyl sulfone, 3,4-dichlorophenyl methyl sulfone, 4-(methylsulfonyl)toluene, 2-(methylsulfonyl)ethanol, 4-bromophenyl methyl sulfone, 2-bromophenyl methyl sulfone, 4-fluorophenyl methyl sulfone, 2-fluorophenyl methyl sulfone, 4-aminophenyl methyl sulfone, a sultone (e.g., 1,3-propanesultone), and sulfone solvents containing ether groups (e.g., 2-methoxyethyl(methyl)sulfone and 2-methoxyethoxyethyl(ethyl)sulfone). Some examples of siloxane solvents include hexamethyldisiloxane (HMDS), 1,3-divinyltetramethyldisiloxane, the polysiloxanes, and polysiloxane-polyoxyalkylene derivatives. Some examples of silane solvents include methoxytrimethylsilane, ethoxytrimethylsilane, dimethoxydimethylsilane, methyltrimethoxysilane, and 2-(ethoxy)ethoxytrimethylsilane. Some examples of ether solvents include diethyl ether, 1,2-dimethoxyethane, 1,2-diethoxyethane, 1,3-dioxolane, tetrahydrofuran, 2-methyltetrahydrofuran, tetrahydropyran, diglyme, triglyme, 1,3-dioxolane, a dioxane, and the fluorinated ethers (e.g., mono-, di-, tri-, tetra-, penta-, hexa- and per-fluoro derivatives of any of the foregoing ethers). Some examples of ester solvents include 1,4-butyrolactone, ethylacetate, methylpropionate, ethylpropionate, propylpropionate, methylbutyrate, ethylbutyrate, the formates (e.g., methyl formate, ethyl formate, or propyl formate), and the fluorinated esters (e.g., mono-, di-, tri-, tetra-, penta-, hexa- and per-fluoro derivatives of any of the foregoing esters). Some examples of nitrile solvents include acetonitrile, propionitrile, and butyronitrile. Some examples of sulfoxide solvents include dimethyl sulfoxide, ethyl methyl sulfoxide, diethyl sulfoxide, methyl propyl sulfoxide, and ethyl propyl sulfoxide. Some examples of amide solvents include formamide, N,N-dimethylformamide, N,N-diethylformamide, acetamide, dimethylacetamide, diethylacetamide, gamma-butyrolactam, and N-methylpyrrolidone. The non-ionic solvent can be included in a non-additive or additive amount, such as any of the exemplary amounts provided above for the ionic liquids. The non-ionic solvent may also be, for example, an organochloride (e.g., methylene chloride, chloroform, 1,1,-trichloroethane), ketone (e.g., acetone, 2-butanone), hexamethylphosphoramide (HMPA), N-methylpyrrolidinone (NMP), 1,3-dimethyl-3,4,5,6-tetrahydro-2(1H)-pyrimidinone (DMPU), and propylene glycol monomethyl ether acetate (PGMEA). In some embodiments, any one or more classes or specific types of organic solvents are excluded from the electrolyte.

In another embodiment, the solvent in the electrolyte is an ionic liquid. The ionic liquid can be conveniently described by the formula $Y^+X^-$, wherein $Y^+$ is a cationic component of the ionic liquid and $X^-$ is an anionic component (counteranion) of the ionic liquid, which can be any of the counteranions well known in the art and as provided above for the metal salts. The formula $(Y^+)(X^-)$ is meant to encompass a cationic component $(Y^+)$ having any valency of positive charge, and an anionic component $(X^-)$ having any valency of negative charge, provided that the charge contributions from the cationic portion and anionic portion are counterbalanced in order for charge neutrality to be preserved in the ionic liquid molecule. More specifically, the formula $(Y^+)(X^-)$ is meant to encompass the more generic formula $(Y^{+a})_y(X^{-b})_x$, wherein the variables a and b are, independently, non-zero integers, and the subscript variables x and y are, independently, non-zero integers, such that $a \cdot y = b \cdot x$ (wherein the period placed between variables indicates multiplication of the variables). The foregoing generic formula encompasses numerous possible sub-formulas, such as, for example, $(Y^+)(X^-)$, $(Y^{+2})(X^-)_2$, $(Y^+)_2(X^{-2})$, $(Y^{+2})_2(X^{-2})_2$, $(Y^{+3})(X^-)_3$, $(Y^+)_3(X^{-3})$, $(Y^{+3})_2(X^{-2})_3$, and $(Y^{+2})_3(X^{-3})_2$. For simplicity, numerous embodiments of ionic liquids, described below, designate the anion as $X^-$, which in its strict sense indicates a monovalent anion. However, the anion designated as $X^-$ is meant to encompass an anion of any valency, such as any of the valencies described above and further below, unless otherwise specified. In some embodiments, $Y^+$ can be a metal cation (e.g., an alkali metal, such as $Li^+$), while in other embodiments $Y^+$ is not a metal cation. In some embodiments, $Y^+$ can be an inorganic species, while in other embodiments, $Y^+$ is an organic species.

The ionic liquid is typically a liquid at room temperature (e.g., 15, 18, 20, 22, 25, or 30° C.) or lower. However, in some embodiments, the ionic liquid may become a liquid at a higher temperature than 30° C. if it is used at an elevated temperature that melts the ionic liquid. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C.

In various embodiments, the cationic portion $(Y^+)$ of the ionic liquid $Y^+X^-$ is selected from imidazolium, pyridinium, pyrazinium, pyrrolidinium, piperidinium, piperazinium, morpholinium, pyrrolium, pyrazolium, pyrimidinium, triazolium, oxazolium, thiazolium, and triazinium rings, as well as quaternary ammonium, phosphonium, sulfonium, and cyclic and acyclic guanidinium rings. Any of the foregoing cationic rings may be bound or fused with one or more other saturated or unsaturated (e.g., aromatic) rings, such as a benzene, cyclohexane, cyclohexene, pyridine, pyrazine, pyrrolidine, piperidine, piperazine, pyrrole, pyrazole, pyrimidine, or indole rings. Some examples of fused charged rings include benzimidazolium, pyrrolo[1,2-a]pyrimidinium, indolium, quinolinium, quinazolinium, quinoxalinium, 5,6,7,8-tetrahydroimidazo[1,2-a]pyridine, and H-imidazo[1,2-a]pyridine. Any of the foregoing cationic rings may also be substituted by one or more hydrocarbon groups. Typically, at least one ring nitrogen atom is substituted with a hydrocarbon group (R) to provide the positive charge. Ionic liquids containing any of the foregoing cationic components are either commercially available or can be synthesized by procedures well-known in the art, as evidenced by, for example, T. L. Greaves, et al., "Protic Ionic Liquids: Properties and Applications", *Chem. Rev.*, 108, pp. 206-237 (2008), the contents of which are herein incorporated by reference in their entirety. Any of the ionic liquids described in the foregoing reference may be used herein. Moreover, in some embodiments, the liquid aspect of the electrolyte can include only an organic solvent, only an ionic liquid, or an admixture of an organic solvent and ionic liquid, in which case either the organic solvent may be included in an approximately equivalent or greater amount than the ionic liquid or vice-versa. In some embodiments, any one or more types of ionic liquids described above are excluded from the electrolyte.

The liquid electrolyte contained within the nanostructures may alternatively have an inorganic composition (i.e., an absence of carbon). An example of such a liquid electrolyte is a mixture of thionyl chloride ($SOCl_2$) and lithium tetrachloroaluminate ($LiAlCl_4$), as used in some lithium batteries.

In another aspect, the invention is directed to a metal-ion battery containing any of the nanoconfined electrolyte compositions described above. In the metal-ion battery, the nanoconfined electrolyte, described above, is in contact with positive and negative electrodes of the battery. The metal-ion battery can be a rechargeable or non-rechargeable design, but is more typically a rechargeable metal-ion ion battery.

Lithium-ion batteries are well known in the art. The lithium-ion battery may contain any of the components typically found in a lithium ion battery, including positive and negative electrodes (i.e., cathode and anode, respectively), current collecting plates, and a battery shell, such as described in, for example, U.S. Pat. Nos. 8,252,438, 7,205,073, and 7,425,388, the contents of which are incorporated herein by reference in their entirety. The positive electrode (cathode) can be, for example, manganese dioxide ($MnO_2$), iron disulfide ($FeS_2$), copper oxide (CuO), or a lithium metal oxide, wherein the metal is typically a transition metal, such as Co, Fe, Ni, or Mn, or combination thereof. Some examples of lithium metal oxides include $LiCoO_2$, $LiNiCoO_2$, $LiMnO_2$, and $LiFePO_4$. Recently, with an effort to increase the energy density of the LIBs, 5.0V positive electrode materials, such as $LiNi_{0.5}Mn_{1.5}O_4$, $LiNi_xCo_{1-x}PO_4$, and $LiCu_xMn_{2-x}O_4$, have been developed (Cresce, A. V., et al., *Journal of the Electrochemical Society*, 2011, 158, A337-A342). To improve conductivity at the positive electrode, conductive carbon material (e.g., carbon black, carbon fiber, or graphite) is typically admixed with the positive electrode material. The negative electrode (anode) can be lithium metal, but is more typically a carbon-based composition in which lithium ions can intercalate or embed, such as graphite (e.g., natural or artificial graphite), petroleum coke, carbon fiber (e.g., mesocarbon fibers), or carbon (e.g., mesocarbon) microbeads. The negative electrode may also be a metal oxide, such as tin dioxide ($SnO_2$) or titanium dioxide ($TiO_2$), or a composite of carbon and a metal oxide. The positive and negative electrode compositions are typically admixed with an adhesive (e.g., PVDF, PTFE, and co-polymers thereof) in order to be properly molded as electrodes. A conductive substance (e.g., a conductive carbon) may or may not also be included. Typically, positive and negative current collecting substrates (e.g., Cu or Al foil) are also included. The assembly of lithium ion batteries is well known in the art.

Sodium-ion batteries are also well known in the art, such as described in, for example, U.S. Application Publication No. 2012/0021273, and B. L. Ellis, et al., *Current Opinion in Solid State and Materials Science*, 16, 168-177, 2012, the contents of which pertaining to sodium-ion batteries are herein incorporated by reference in their entirety. The sodium-ion battery may employ, for example, a sodium inorganic material as the active material in the cathode. Some examples of sodium inorganic materials include, for example, $NaFeO_2$, $NaMnO_2$, $NaNiO_2$, and $NaCoO_2$. Other cathode materials for sodium-ion batteries include transition metal chalcogenides, such as described in U.S. Pat. No. 8,906,542, and sodium-lithium-nickel-manganese oxide materials, such as described in U.S. Pat. No. 8,835,041, the contents of which are herein incorporated by reference in their entirety.

Magnesium-ion batteries are also well known in the art, such as described in, for example, M. M. Huie, et al., *Coordination Chemistry Reviews*, vol. 287, pp. 15-27, March 2015; S. Tepavcevic, et al., *ACS Nano*, DOI: 10.1021/acsnano.5b02450, Jul. 14, 2015; *Beilstein J. Nanotechnol.*, 5, 1291-1311, 2014; and U.S. Application Pub. No. 2015/0056499, the contents of which are herein incorporated by reference in their entirety. The magnesium battery may contain any of the components typically found in a magnesium battery, including cathode (positive) and anode (negative) electrodes, current collecting plates, and a battery shell, such as described in, for example, U.S. Pat. No. 8,361,661, U.S. Application Pub. Nos. 2013/0034780 and 2008/0182176, and PCT Publication WO2013/096827, the contents of which are incorporated herein by reference in their entirety. The positive electrode can include, as an active material, for example, a transition metal oxide or transition metal sulfide material, such as the composition $M_xMo_6T_8$, wherein M is at least one metal selected from alkaline earth and transition metals, T is selected from at least one of sulfur, selenium, and tellurium, and x is a value of 0 to 2. The negative electrode is generally a magnesium-containing electrode, which may include magnesium in elemental or divalent form. In elemental form, the magnesium may be either in the absence of other metals (i.e., substantially or completely pure magnesium, except for a possible trace of other metals, e.g., up to 1, 0.5, or 0.1 wt %) or in the form of a magnesium alloy, e.g., AZ31, AZ61, AZ63, AZ80, AZ81, ZK51, ZK60, ZC63, or the like. In some embodiments, the negative electrode can be or include a magnesium intercalation material, which may, before operation, not yet include magnesium intercalated therein. Some examples of magnesium intercalation materials include any of the materials described above for the positive electrode, anatase or rutile $TiO_2$, $FeS_2$, $TiS_2$, or $MoS_2$.

Zinc-ion batteries are also well known in the art, such as described, for example, in U.S. Pat. No. 8,663,844 and B. Lee et al., *Scientific Reports*, 4, article no. 6066 (2014), the contents of which are herein incorporated in their entirety. The cathode can include, for example, a composition based on manganese dioxide, and the anode may be zinc or zinc alloy.

Aluminum-ion batteries are also well known in the art, such as described, for example, in U.S. Pat. No. 6,589,692 and WO 2013/049097, the contents of which are herein incorporated in their entirety. The cathode can include, for example, a graphitic, manganese oxide (e.g., $Mn_2O_4$), or vanadium oxide material cathode, and the anode may be aluminum or aluminum alloy.

In yet another aspect, the invention is directed to a method of producing the nanoconfined electrolyte described above. Any method for producing the nanoconfined electrolyte is considered herein. The method includes, at minimum, some means of incorporating the metal-containing electrolyte, as described above, into hollow enclosed nanostructures (i.e., "hollow nanostructures"), as also described above, and rendering the filled nanostructures in the form of a layer either during or after the electrolyte incorporation process. For example, the method may involve in situ production of the hollow nanostructures in the liquid electrolyte, and subsequent removal of extraneous electrolyte from the electrolyte-filled nanostructures.

In a particular embodiment, a layer of hollow nanostructures in which the hollow nanostructures are in physical contact with each other is first produced. The layer of hollow nanostructures can be produced by, for example, placing an amount of the hollow nanostructures into a container and compacting the nanostructures into a denser layer by, for example, the application of an elevated pressure. The hollow nanostructures should be sufficiently resilient to withstand the elevated pressure without significant deformation or rupture, while at the same time the pressure should be below an amount that could significantly deform or rupture the hollow nanostructures while being above standard atmospheric pressure of about 1 atm (0.0001 GPa). In different embodiments, the elevated applied pressure may be at least, for example, 10 atm (0.001 GPa), 50 atm, 100 atm (0.01 GPa), 1000 atm (0.1 GPa), 1 GPa, 2 GPa, 5 GPa, or 10 GPa, or a pressure within a range between any two of these values. Significantly, the thickness of the layer can be selectively tuned by judicious selection in either the weight amount of hollow nanostructures used or the height of the hollow nanostructures in the container before application of the elevated pressure. After forming the layer of hollow nanostructures, the hollow nanostructures are loaded with the liquid electrolyte by infusion of the liquid electrolyte through walls of the hollow nanostructures. To permit infusion, the layer of nanostructures need to be contacted with the liquid electrolyte. The hollow nanostructures are generally soaked in the liquid electrolyte for a sufficient time (e.g., 3, 6, 12, 24, 30, 36, or 48 hours) to permit the hollow nanostructures to become substantially (i.e., generally at least or above 80%, 85%, 90%, or 95%) or completely (about 100%) filled with the liquid electrolyte. In some embodiments, the impregnation of the hollow nanostructures with liquid electrolyte is hastened by applying pressure onto the hollow nanostructures while in contact with the liquid electrolyte, or the hollow nanostructures may first be depressurized (e.g., less than 1 atm) before being contacted with the liquid electrolyte. In the event that the hollow nanostructures do not possess pores, the liquid electrolyte can generally enter the hollow space of the nanostructures by infusion through the molecular lattice of walls of the hollow nanostructures. In the event that the hollow nanostructures possess suitably sized pores, as discussed above, the liquid electrolyte will use the pores as the primary means of infusion through the walls of the nanostructures to fill the hollow spaces. As discussed above, the pores, if present, must be sufficiently small so as to substantially retain the liquid electrolyte once it enters the hollow space. In an alternative embodiment, hollow nanostructures not in the form of a layer may be impregnated with the liquid electrolyte, and the electrolyte-filled nanostructures subsequently rendered into the form of a layer by disposing the electrolyte-filled nanostructures on a substrate or placing in a container and applying pressure, as described above, or by another process, such as centrifugation.

The method of forming the electrolyte-filled can also include first producing the hollow nanostructures prior to impregnating them with the liquid electrolyte. Methods for producing a wide variety of hollow nanostructures are well known in the art, as discussed above. The method may also include forming the layer of electrolyte-filled nanostructures on a substrate (or in a container, as described above) and either removing the produced film as a monolithic film or leaving the produced film on the substrate if the substrate is meant to be a functional material, such as an anode or cathode material of a lithium or lithium-ion battery.

Examples have been set forth below for the purpose of illustration and to describe certain specific embodiments of the invention. However, the scope of this invention is not to be in any way limited by the examples set forth herein.

Examples

Preparation and Analysis of Nanoconfined Electrolytes Based on Hollow Silica Nanospheres Overview of an Exemplary Process A class of solid electrolytes with liquid-like room-temperature ionic conductivities has herein been fabricated according to a facile procedure starting from hollow silica (HS) nanospheres, as further generally depicted in FIG. 1. As provided in FIG. 1, the procedure employed in this experiment involved placing a designated amount of HS powder into a container (leftmost image), tableting the HS powder into a film by application of sufficient pressure (middle image), and then impregnating the HS film with the liquid electrolyte by soaking the HS film in the liquid electrolyte (rightmost image).

To better shape the nanoparticles as films via close-packing under high pressure, HS nanospheres with a diameter of ca. 25 nm and shell thickness of ca. 5 nm were synthesized and selected as building blocks, since their rather small particle sizes can afford enough mechanical stability against extrusion. In addition, decreasing the particle size of HS is also beneficial to reduce the interparticle voids of HS arrays, which facilitates the fabrication of dense films to better confine organic liquids in the hollow spheres and prevent dendrites from crossing the inter-electrode space.

Preparation of Hollow Silica Nanospheres

Triblock copolymers F127 (1.0 g, $EO_{96}PO_{70}EO_{96}$, MW=12000 gmol$^{-1}$) and 1,3,5-trimethylbenzene (1.00 g) and $K_2SO_4$ (0.87 g) were dissolved in deionized water (60 mL). The mixed solution was stirred at 13.5° C. for 4 hours. Then, tetramethoxysilane (2.43 g) was added to the solution, followed by addition of (3-mercaptopropyl) trimethoxysilane (0.78 g). After stirring at 13.5° C. for 24 hours, the mixture was transferred into a Teflon-lined autoclave and aged at 100° C. for 24 hours. The precipitate was collected by filtration, washed repeatedly with deionized water, and dried at 100° C. The as-synthesized sample was calcined in air at 550° C. for 10 hours to obtain the silica hollow nanospheres (HS).

Layer Formation of Hollow Silica Nanospheres and Impregnation of HS Nanospheres to Form Nanoconfined Electrolytes A center amount of HS power was transferred to a stainless steel holder with inner diameter of 12 mm. Then a pressure as high as 7 G Pa was applied to the holder to mold the powder as film. The thickness of HS-film can be easily adjusted by varying the weight of HS powder, and the thickness of 0.1 g HS-film was measured as 0.76 mm.

Soaking with liquid-state electrolytes: First, the as-prepared HS-film was subjected to vacuum at 200° C. for 24 hours to extract water and the air previously trapped by the HS spheres. After that, the film was transferred to a container filled with a selected electrolyte, in this case either 1.0 M $LiPF_6$/EC-DMC-DEC or 0.5 M LiTFSI/EMIm-TFSI, herein also denoted as $LiPF_6$ electrolyte or LiTFSI electrolyte, respectively, or simply "$LiPF_6$" or "LiTFSI". After sufficient soaking for more than 24 hours, the resultant film was transferred to filter paper for removal of residual solution on surfaces of the film. The corresponding sample was denoted HS-film(A), where A represents the selected liquid-state electrolyte. The amount of liquids confined in the HS-film is calculated from the mass difference of the film before and after soaking.

Analysis of the Nanoconfined Electrolytes

Measurement of Ionic Conductivity:

The ionic conductivity was measured by AC impedance spectroscopy using a frequency in the range of 200 KHz to 100 mHz with a perturbation amplitude of 5 mV. The measurement of the HS-film($LiPF_6$) and HS-film(LiTFSI) was made using a Swagelok cell by sandwiching the membrane between two stainless steel electrodes. The measurement of liquid-state electrolytes of 1.0 M $LiPF_6$/EC-DMC-DEC and 0.5 M LiTFSI/EMIm-TFSI was carried out in a self-made conductivity cell with two parallel platinum electrodes, which was calibrated with a 0.1M KCl aqueous solution.

Symmetric Cell Test:

A symmetric cell with Li metal on both sides of HS-film ($LiPF_6$) was assembled as a coin cell under an argon environment. A fixed protocol was used in this test wherein the cell was periodically charged and discharged at a constant current density of 0.16 mA cm$^{-2}$ and 0.32 mA cm$^{-2}$.

Figures 2A, 2B, 2C, 2D, 2E, 2F:
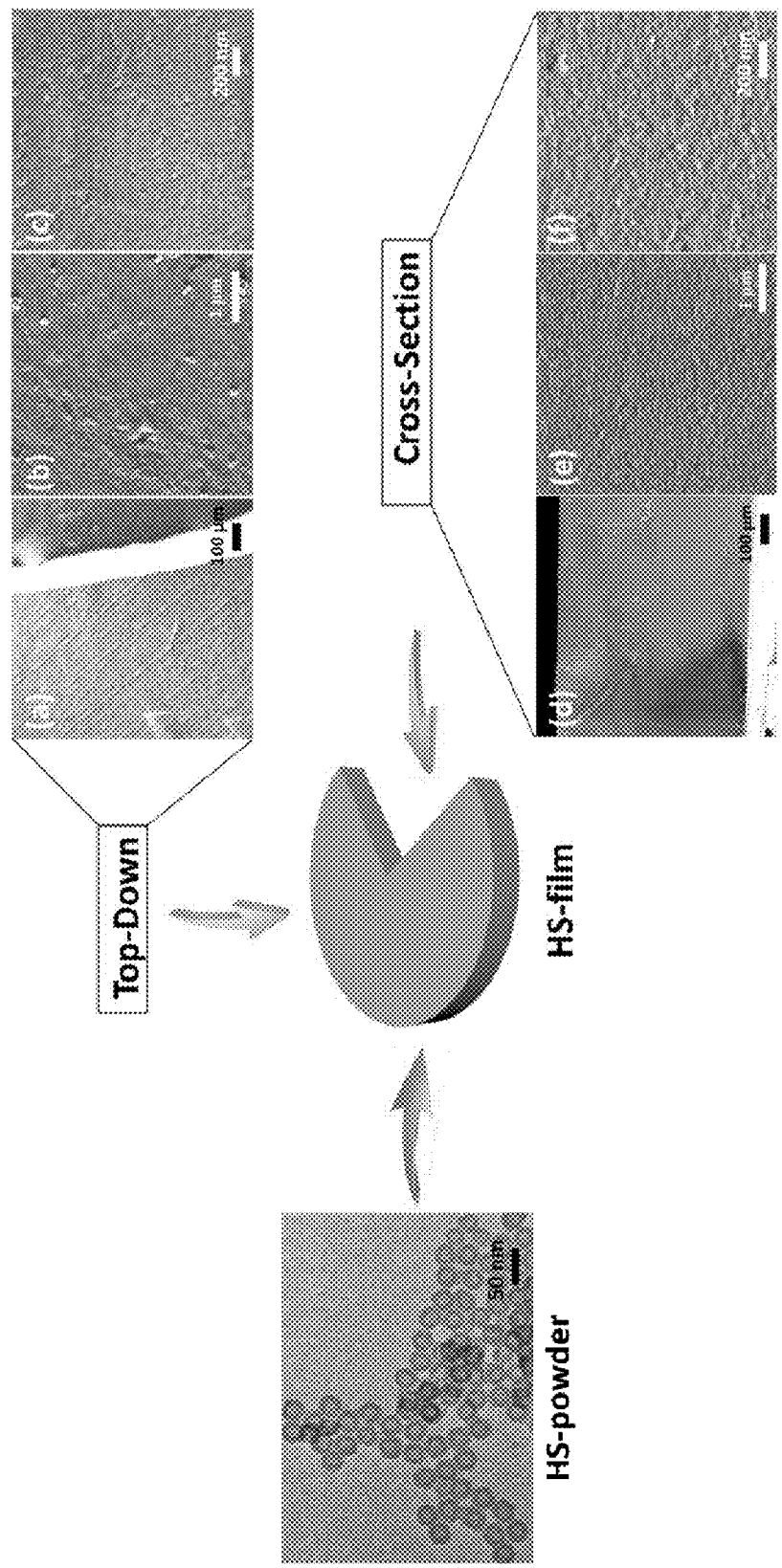
FIGS. 2A-2F. Field emission scanning electron microscope (SEM) images of a hollow silica (HS) film, with FIGS. 2A, 2B, and 2C being successively magnified top-down (planar surface) images of the HS film, and FIGS. 2D, 2E, and 2F being successively magnified cross-section images of the HS film.

The surface morphologies and the local-packing of the nanoparticle arrays in HS-film are carefully examined by field emission scanning electron microscopy (SEM). In the "top-down" SEM images in FIGS. 2A-2C, the individual nanospheres are closely squeezed together as a free-standing film in dense packing. In principle, such an HS-film can function as a mechanics-strong separator in a cell system to block the Li dendrites during charge-discharge cycling, because of the higher mechanical modulus of $SiO_2$ over Li metal. The cross-section morphologies of HS-film are imaged in FIGS. 2D-2F, in which typical patterns resulting from particle stacking are observed. In nanodomains, the large inter-particle space present in HS-powder is evidently reduced by high pressure extrusion, which is of great importance for the fabrication of the electrolyte, since the voids between neighboring nanospheres are too large for Li$^+$ transport. For example, the ionic conductivity of HS-powder that fully soaked with the liquid electrolyte is measured as low as 10$^{-7}$ S cm$^{-1}$. This poor conductivity can be greatly enhanced by applying a small amount of force to decrease the inter-particle voids. For this reason, there is a significant advantage in reducing the inter-particle voids for Li$^+$ transport. Furthermore, the preservation of hollow nanoarchitectures in the HS-film is clearly demonstrated by the SEM images in FIGS. 2A-2F.

Figure 3:
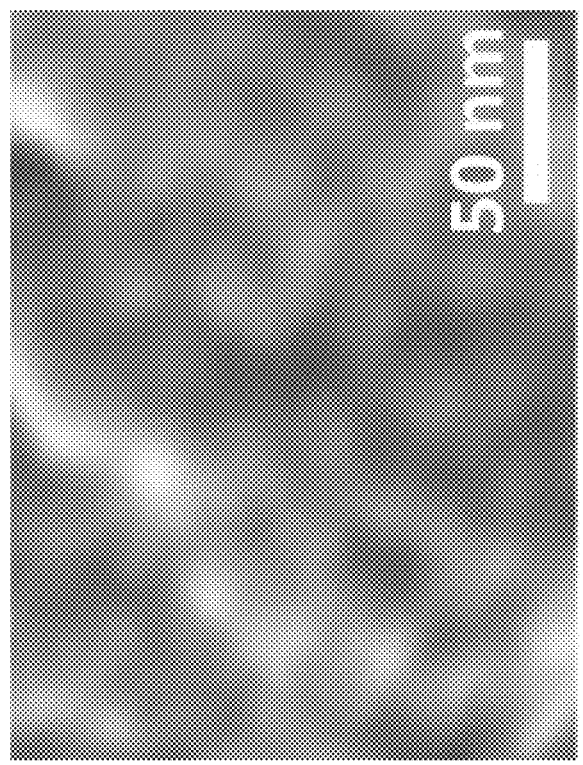
FIG. 3. A highly magnified SEM image of the HS film.
Figures 4A, 4B:
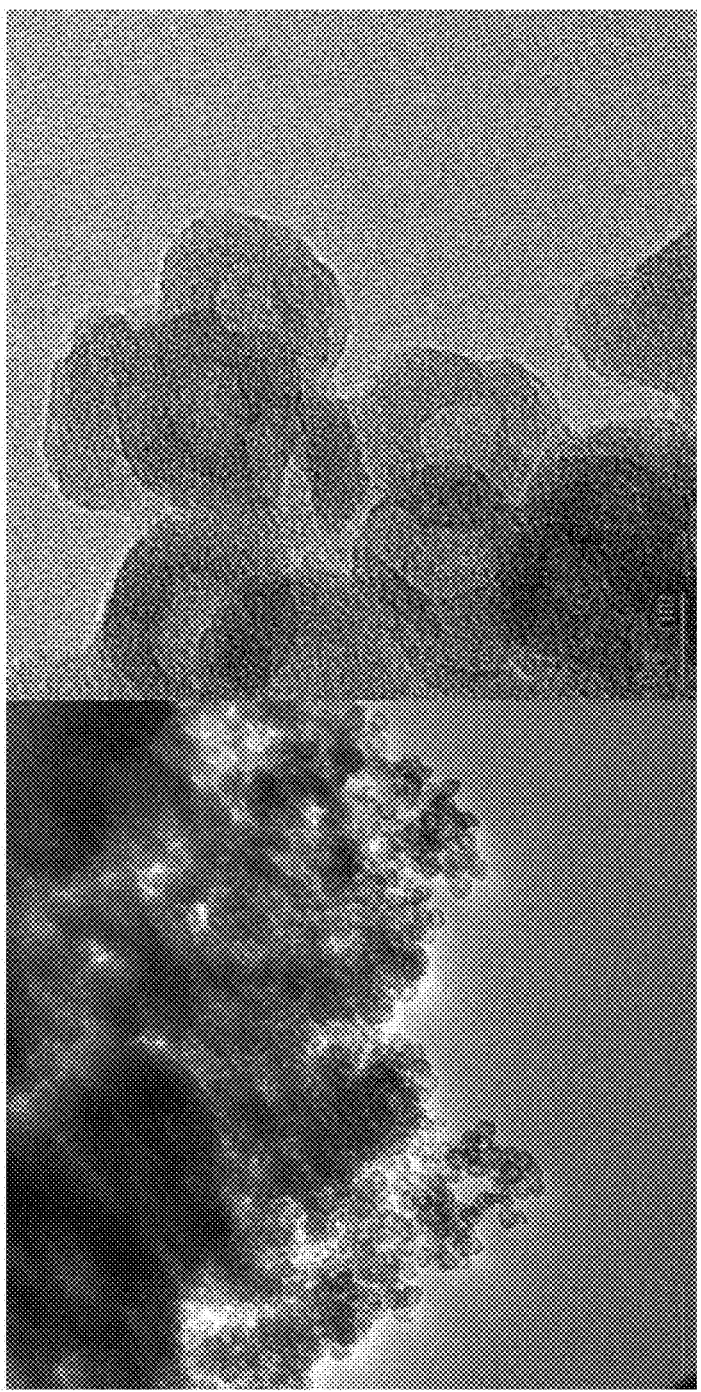
FIGS. 4A, 4B. Transmission electron microscope (TEM) image of the HS film (FIG. 4A) and high resolution TEM (HRTEM) image of the HS film (FIG. 4B).

FIG. 3 shows a highly magnified SEM image of the HS film. FIG. 4A is a transmission electron microscope (TEM) image of the HS film, while FIG. 4B is a high resolution TEM (HRTEM) image of the HS film. In FIGS. 3, 4A, and 4B, well-defined nanospheres are clearly observed without any deformation, and the hollow structure is still preserved in the HS-film. This finding is significant, as it indicates that the HS nanospheres are robust enough to withstand high pressure and retain their morphologies as nanocontainers for liquid loading. As a result of close packing, it was difficult to achieve a monodisperse layer of hollow spheres on the grid for TEM measurement, and thus, an aggregation of particles is observed.

Figures 5A, 5B:
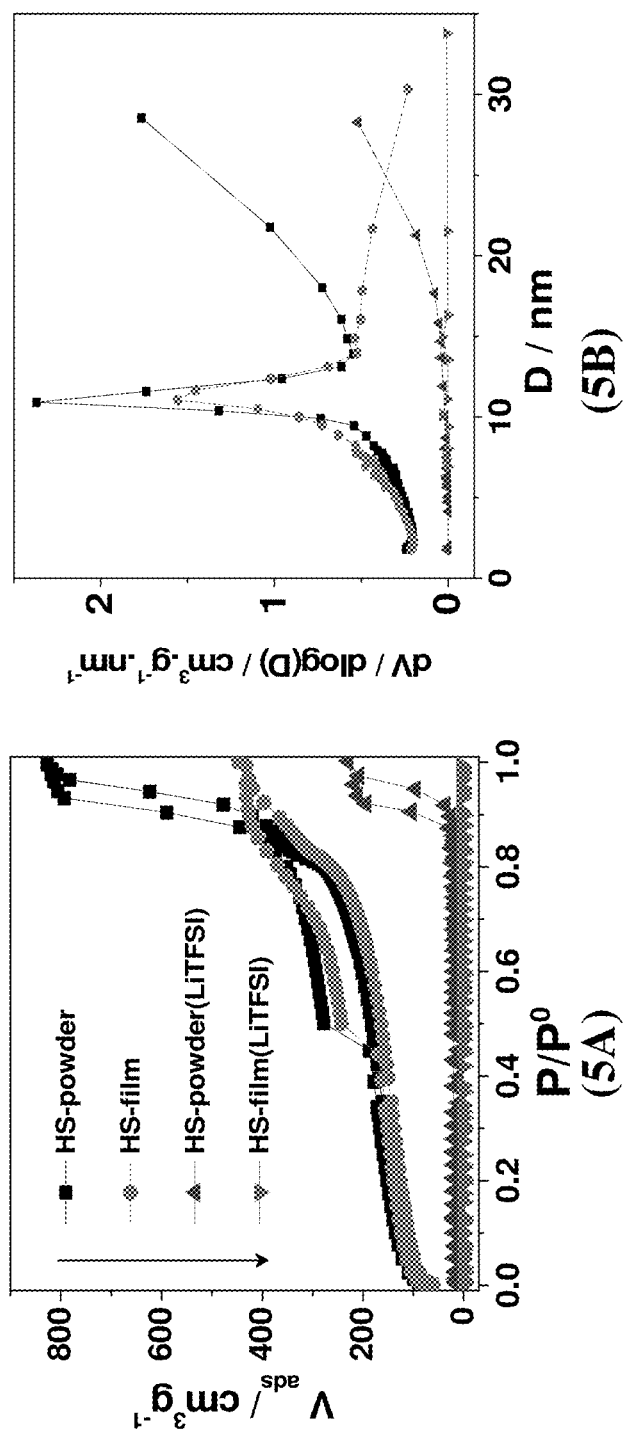
FIGS. 5A, 5B. Nitrogen-sorption isotherms (FIG. 5A) and BJH pore size distribution (FIG. 5B) of: HS powder (curve containing squares); HS film (curve containing circles); HS powder filled with LiTFSI/EMIm-TFSI electrolyte (curve containing upward-pointing triangles); and HS film filled with LiTFSI/EMIm-TFSI electrolyte (curve containing downward-pointing triangles), where LiTFSI/EMIm-TFSI=lithium bis(trifluoromethanesulfonyl)-imide/ethylmethylimidazolium bis(trifluoro methanesulfonyl)imide, also referred to as "LiTFSI electrolyte".
Figures 6A, 6B, 6C:
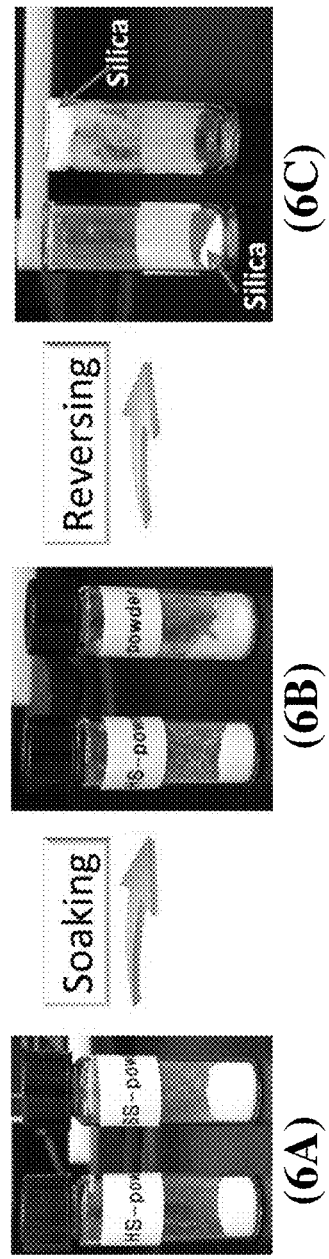
FIGS. 6A-6C. Photographs showing HS powder and SS (solid silica) powder in two separate vials, before (FIG. 6A) and after (FIG. 6B) soaking with 1.0 M $LiPF_6$/EC-DMC-DEC electrolyte, and then inverting the vials (FIG. 6C) to observe properties, wherein $LiPF_6$/EC-DMC-DEC=$LiPF_6$/ethylene carbonate-dimethyl carbonate-diethyl carbonate, also referred to as "$LiPF_6$ electrolyte".

The nanotextural structure of the HS-film and the HS-powder is characterized by $N_2$-sorption isotherms and the corresponding Barrett-Joyner-Halenda (BJH) pore-size distributions. In FIG. 5A, a significant decrease of $N_2$ uptake in the region of relative pressure)(P/P$^0$ above 0.85 is clearly observed upon molding the HS-powder as an HS-film. This indicates that the large inter-particle space between neighboring nanospheres is efficiently reduced by high pressure extrusion, which is in good agreement with the observation of the SEM images. Correspondingly, a quick drop of the BJH pore-size distribution is observed at a diameter over 15 nm, suggesting that the mesopores formed by nanospheres accumulation are seriously removed (FIG. 5B). In contrast, no evident difference in isotherm could be discovered between the HS-film and the HS-powder below the region of 0.85 P/P$^0$, which directly indicates that the nanoarchitecture of the HS nanospheres, in particular, the hollow framework with the microporous shells, are perfectly preserved in the HS-film without any collapse. This important finding means that the unique nanostructural properties of the HS can be exploited for the fabrication of solid-like electrolytes by employing the empty hollow space for liquid loading and the microporous silica shells for liquids confining. Notably, the abundant micropores across the silica shells, in principle, should work with a similar function of capillary action to keep the liquids from leaking and quick loss, which makes the full liquid-soaked HS-powder and HS-film remain in an apparent dry solid-state. To demonstrate this conclusion, an additional experiment was conducted in which HS-powder and SS-powder (hollow and solid silica powder, respectively) in two separate vials were soaked with 1.0 M LiPF$_6$/EC-DMC-DEC, and the vials inverted to observe the properties. The photographic results are shown in FIGS. 6A-6C, where FIG. 6A shows the HS powder and SS powder before soaking, FIG. 6B shows the HS powder and SS powder after soaking, and FIG. 6C shows the HS powder and SS powder after inverting the vials after soaking. As shown in FIGS. 6A-6C, the HS-powder (fully soaked with organic liquid electrolyte) still remained in the dry solid state, while the solid silica spheres (ca. 30 nm) exhibited behavior expected of wet gelatinous materials. The foregoing results visually highlight the importance of hollow structures for electrolyte fabrication for purposes of the instant invention. The corresponding textural parameters calculated from N$_2$-sorption isotherms are listed in Table 1 below.

TABLE 1

Textural parameters calculated from N$_2$-sorption isotherms.

| Sample | Surface area (m$^2$ g$^{-1}$) | Pore volume (cm$^3$ g$^{-1}$) | Pore diameter (nm) |
|---|---|---|---|
| HS-powder | 489 | 0.936 | 11 |
| HS-film | 451 | 0.634 | 11 |
| HS-powder(LiTFSI) | 33 | 0.148 | 25 |
| HS-film(LiTFSI) | <1 | 0.002 | — |

Interestingly, the opaque HS-film became optically transparent after being fully soaked with liquid media, which directly demonstrates that the empty cavities have been fully filled with liquids to allow visible light to pass through. For 0.1 g HS-film, the loading amount of LiPF$_6$/EC-DMC-DEC and LiTFSI/EMIm-TFSI was determined as 0.073 g and 0.092 g, respectively, which reached a degree of volume filling as high as 96.8% and 92.9%, respectively (Table 1). To better demonstrate that the liquids are primarily confined in the empty hollow spheres rather than the inter-particle voids, HS-powder filled with LiTFSI/EMIm-TFSI (denoted as HS-powder(LiTFSI)) was subjected to N$_2$-sorption characterization. In FIG. 5A, the N$_2$ uptake below the region of 0.85 quenches quickly, while the hysteresis loop originating from the accumulation of nanospheres is still present in the higher P/P$^0$ region. This observation suggests that the inner space of the hollow spheres have been already occupied by ionic liquid molecules, but the inter-particle voids are still empty. In comparison, the empty cavities in the HS-film(LiTFSI) have been completely removed by the inclusion of ionic liquid molecules (FIG. 5A).

Figures 7A, 7B:
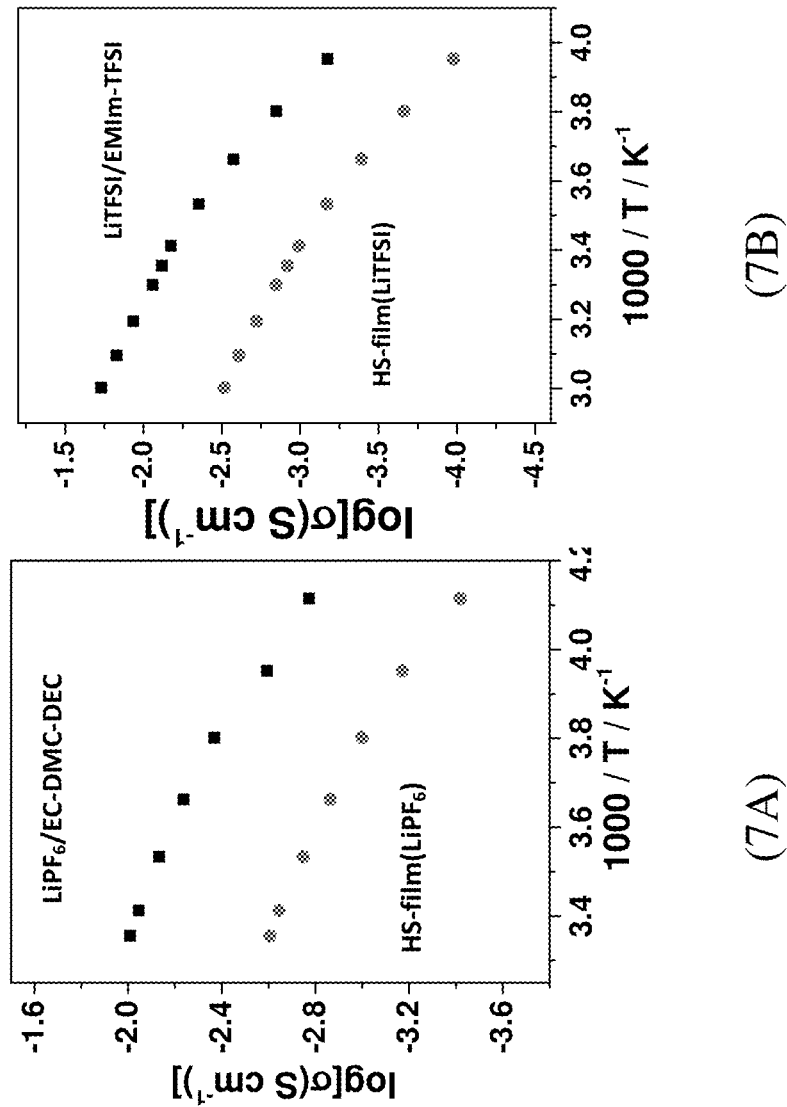
FIGS. 7A, 7B. Graphs showing temperature dependence of ionic conductivities of: HS film filled with $LiPF_6$ electrolyte (FIG. 7A), and HS film filled with LiTFSI electrolyte (FIG. 7B).
Figure 8A:
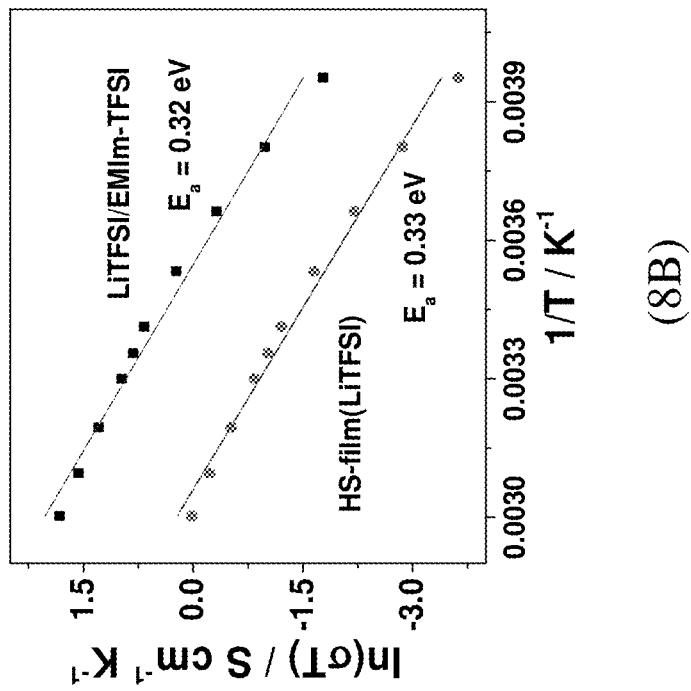
FIGS. 8A, 8B. Graphs showing Arrhenius plots of ionic conductivity data obtained on HS film filled with $LiPF_6$ electrolyte as compared with only 1.0 M $LiPF_6$ electrolyte (FIG. 8A), and Arrhenius plots of ionic conductivity data obtained on HS film filled with LiTFSI electrolyte as compared with only 0.5 M LiTFSI electrolyte (FIG. 8B).
Figure 8B:
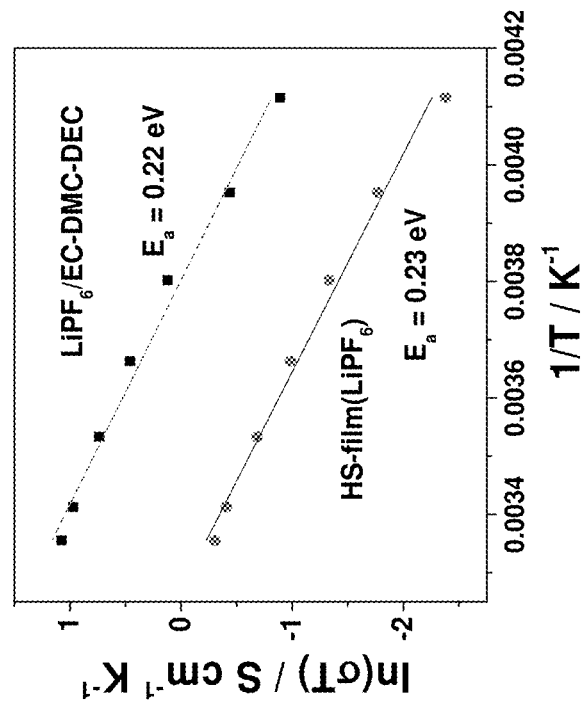

The ionic conductivities of HS-film(LiPF$_6$) and HS-film (LiTFSI) are characterized as a function of temperature. As shown by the plots in FIGS. 7A and 7B, the ionic conductivities of both HS-film(LiPF$_6$) and HS-film(LiTFSI), respectively, exhibit a typical Arrhenius-type behavior. FIGS. 8A, 8B are Arrhenius plots of ionic conductivity data obtained on HS film filled with LiPF$_6$ electrolyte as compared with only 1.0 M LiPF$_6$ electrolyte (FIG. 8A), and Arrhenius plots of ionic conductivity data obtained on HS film filled with LiTFSI electrolyte as compared with only 0.5 M LiTFSI electrolyte (FIG. 8B). As shown in FIGS. 8A and 8B, the activation energies ($E_a$) of HS-film(LiPF$_6$) and HS-film(LiTFSI) are calculated as 0.23 eV and 0.33 eV, respectively. These $E_a$ values are almost the same as their corresponding liquid-state counterparts (0.22 eV and 0.32 eV), which demonstrates that the fundamental ion transport properties remain unchanged within the HS film. As a result of strong nanoconfinement to well preserve liquids in hollow spheres, a slight drop of ionic conductivities was discovered for the solid-like electrolytes. For example, the room-temperature conductivities of the HS-film(LiPF$_6$) and the HS-film(LiTFSI) were determined as 2.5 mS cm$^{-1}$ and 1.2 mS cm$^{-1}$, which are only less than one order of magnitude lower than their respective liquids (10 mS cm$^{-1}$ and 7.6 mS cm$^{-1}$), but still meet the requirement for a normal battery operation (1 mS cm$^{-1}$ at ambient temperature). These typical liquid-like ionic conductivities suggest that the hollow nanoarchitectures are a promising host for liquid electrolytes loading to afford superior conductivity.

Figure 9:
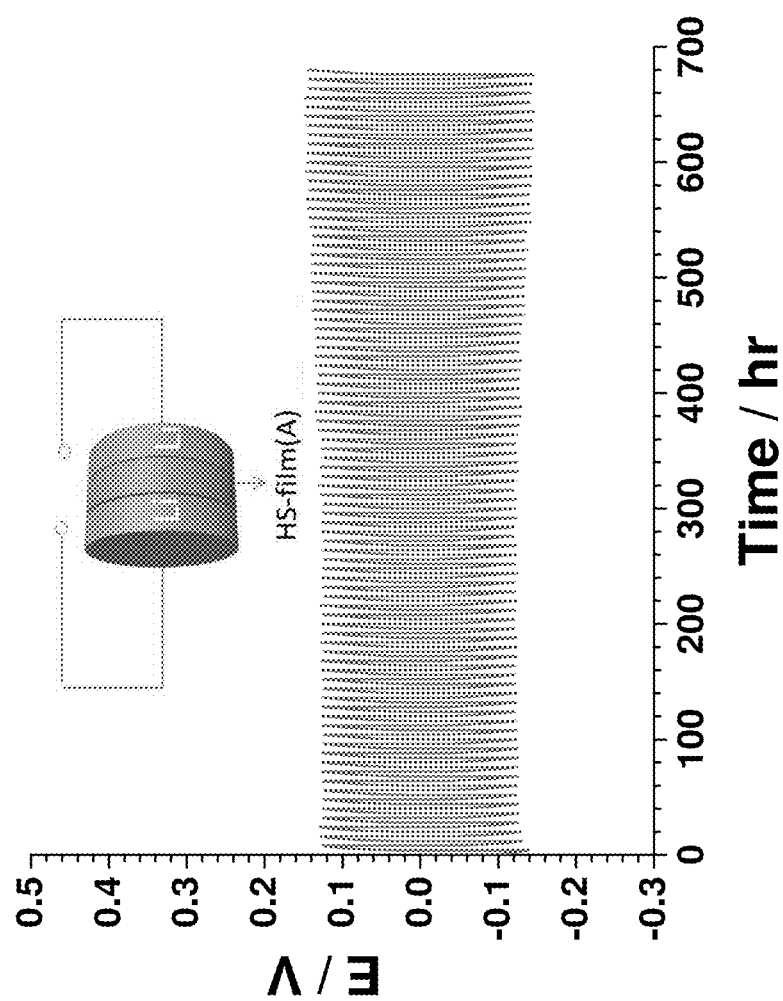
FIG. 9. Graph showing voltage profiles for lithium plating/stripping experiment as a function of time for symmetric lithium coin cells cycled at a fixed current density of 0.16 mA cm$^{-2}$, with graphical inset depicting a Li|HS-film (electrolyte)|Li symmetric cell.
Figure 10:
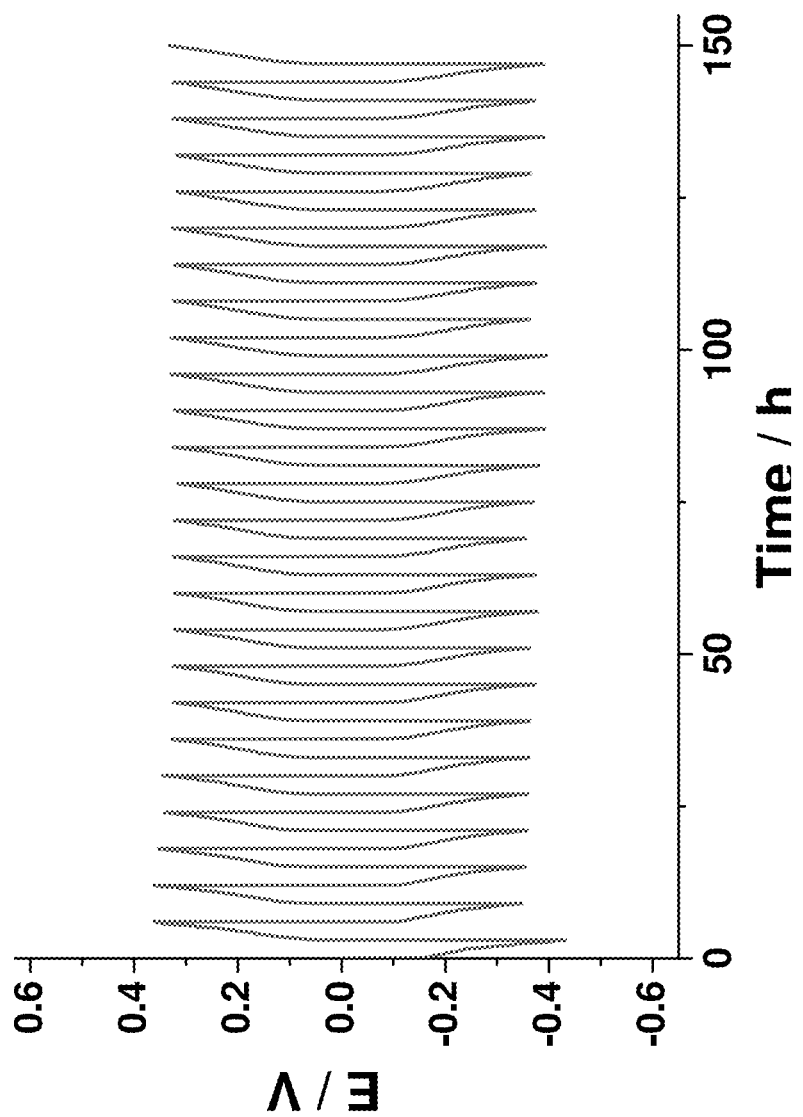
FIG. 10. Graph showing voltage profiles for lithium plating/stripping experiment as a function of time for symmetric lithium coin cells cycled at a fixed current density of 0.32 mA cm$^{-2}$.

To evaluate the mechanical stability of the HS-film against Li dendrites, a time-dependent voltage profile generated by periodically charged and discharged with a constant current density was performed on a symmetric Li||Li cell assembled by HS-film(LiPF$_6$) electrolyte (FIG. 9, top diagram), mincing the operation in Li metal batteries. In FIG. 9 (bottom graph), a rather stable voltage profile without any voltage drop was realized on the Li|HS-film (LiPF$_6$)|Li symmetric cell, with the cell cycled under a high current density of 0.16 mA cm$^{-2}$ for almost 700 hours. As shown by the voltage profile in FIG. 10, at a current density doubled to 0.32 mA cm$^{-2}$, cell failure caused by short-circuit was still surprisingly not observed. The foregoing result suggests that the HS-film is mechanically robust enough to overcome dendrite problems, which advantageously stabilizes the cell system from failure by an internal short-circuit in a long term operation under conditions where dendrites would be expected to form.

In conclusion, well-preserved hollow spheres with microporous silica shells in an HS-film exhibited strong nanoconfinement behavior that retained liquids in empty cavities. The results demonstrate that HS arrays in a close packing arrangement can function as a mechanically strong separator to efficiently block Li dendrites from short-circuiting the cell system during repeated charge-discharge cycling. After being fully soaked with liquid-state electrolytes (e.g., LiPF$_6$/EC-DMC-DEC and LiTFSI/EMIm-TFSI), the resultant HS-film(LiPF$_6$) and HS-film(LiTFSI) achieved room-temperature conductivities as high as 2.5 mS cm$^{-1}$ and 1.2 mS cm$^{-1}$, respectively, while still remaining in the dry solid-state. In a symmetric lithium/lithium cell, the solid-like electrolytes demonstrated a robust performance against Li dendrite problems, which successfully stabilized the cell system from short-circuiting in a long-time operation at current densities ranging from 0.16 to 0.32 mA cm$^{-2}$.

While there have been shown and described what are at present considered the preferred embodiments of the invention, those skilled in the art may make various changes and modifications which remain within the scope of the invention defined by the appended claims.

What is claimed is:

1. A nanoconfined metal-containing electrolyte comprising a layer of enclosed nanostructures having a particle size of at least 10 nm and up to 500 nm, wherein each enclosed nanostructure contains a liquid metal-containing electrolyte, wherein said enclosed nanostructures are in physical contact with each other, wherein said enclosed nanostructures contain pores, with at least 90% of the pores having a pore size of up to 6 nm, and wherein said nanostructures are hollow when not filled with the liquid metal-containing electrolyte.

2. The electrolyte according to claim 1, wherein said enclosed nanostructures contain pores, with at least 90% of the pores having a pore size of up to 2 nm.

3. The electrolyte according to claim 1, wherein said enclosed nanostructures have a particle size of at least 10 nm and up to 100 nm.

4. The electrolyte according to claim 1, wherein said enclosed nanostructures have a particle size of at least 10 nm and up to 50 nm.

5. The electrolyte according to claim 1, wherein said enclosed nanostructures have a metal oxide composition.

6. The electrolyte according to claim 5, wherein said metal oxide composition is silicon oxide.

7. The electrolyte according to claim 1, wherein said enclosed nanostructures have a crosslinked polymer composition.

8. The electrolyte according to claim 1, wherein said liquid metal-containing electrolyte comprises metal salt dissolved in an organic solvent.

9. The electrolyte according to claim 1, wherein said liquid metal-containing electrolyte comprises a metal salt dissolved in an ionic liquid.

* * * * *